United States Patent
Hurst et al.

(10) Patent No.: US 9,509,769 B2
(45) Date of Patent: Nov. 29, 2016

(54) REFLECTING DATA MODIFICATION REQUESTS IN AN OFFLINE ENVIRONMENT

(71) Applicant: SAP SE, Walldorf (DE)

(72) Inventors: Adam Hurst, Waterloo (CA); Matt Borges, Kitchener (CA); Tim McClements, Wellesley (CA)

(73) Assignee: SAP SE, Walldorf (DE)

( * ) Notice: Subject to any disclaimer, the term of this patent is extended or adjusted under 35 U.S.C. 154(b) by 101 days.

(21) Appl. No.: 14/193,605

(22) Filed: Feb. 28, 2014

(65) Prior Publication Data

US 2015/0249725 A1 Sep. 3, 2015

(51) Int. Cl.
*H04L 29/08* (2006.01)

(52) U.S. Cl.
CPC .................................. *H04L 67/1095* (2013.01)

(58) Field of Classification Search
CPC .... H04L 67/1095; H04L 67/34; H04L 67/42
See application file for complete search history.

(56) References Cited

U.S. PATENT DOCUMENTS

| | | | | |
|---|---|---|---|---|
| 2002/0080158 A1* | 6/2002 | Storfer | ............... | G06F 17/243 715/700 |
| 2006/0235977 A1* | 10/2006 | Wunderlich | ........ | H04L 67/1097 709/227 |
| 2006/0259728 A1* | 11/2006 | Chandrasekaran | ... | G06F 3/0605 711/170 |
| 2006/0259734 A1* | 11/2006 | Sheu | ................... | G06F 12/1036 711/203 |
| 2007/0260751 A1* | 11/2007 | Meesseman | ......... | G06Q 10/109 709/248 |
| 2011/0225117 A1* | 9/2011 | Nakanishi | ............. | G06F 3/0605 707/602 |
| 2012/0047287 A1* | 2/2012 | Chiu | ..................... | G06F 3/0605 710/8 |
| 2012/0047331 A1* | 2/2012 | Meza | .................... | G06F 12/126 711/134 |
| 2012/0131309 A1* | 5/2012 | Johnson | .................... | G06F 9/30 712/41 |
| 2012/0137098 A1* | 5/2012 | Wang | .................... | G06F 3/0617 711/165 |
| 2013/0297894 A1* | 11/2013 | Cohen | .................. | G06F 3/0679 711/154 |
| 2013/0318055 A1* | 11/2013 | Lorenz | ............... | G06F 12/0804 707/695 |
| 2013/0318192 A1* | 11/2013 | Lorenz | .............. | G06F 17/30575 709/213 |
| 2014/0068197 A1* | 3/2014 | Joshi | ..................... | G06F 3/0659 711/135 |
| 2015/0142855 A1* | 5/2015 | Fast | .................. | G06F 17/30569 707/803 |
| 2015/0193250 A1* | 7/2015 | Ito | ......................... | G06F 9/4856 718/1 |
| 2015/0254018 A1* | 9/2015 | Lam | .................... | H04L 67/1097 710/72 |

* cited by examiner

*Primary Examiner* — Joe Chacko
(74) *Attorney, Agent, or Firm* — Jones Day (57) ABSTRACT

A method for processing data requests may include storing data on a client device received from a data provider maintaining the data. A request may be received to modify the data maintained by the data provider. After connectivity to the data provider is available, the request may be sent to the data provider. After connectivity is not available the request may be processed based on the data stored on the client device and the modified data may be stored on the client device.

17 Claims, 5 Drawing Sheets

Entity Table 400

| Key | Entity Value | Copy Type 430 | Active 440 | Refresh Index 450 |
|---|---|---|---|---|
| Entity A (Server Copy 410) | A | S | 1 | 2 |
| Entity A' (Local Copy 420) | - | L | 0 | - |
| Entity B (Server Copy 410) | - | S | 0 | 2 |
| Entity B' (Local Copy 420) | B | L | 1 | - |
| Entity C (Server Copy 410) | C | S | 0 | 2 |
| Entity C' (Local Copy 420) | - | L | 0 | - |
| Entity D' (Local Copy 420) | D | L | 1 | - |

Request Queue Table 460

| Request ID 470 | Local Changes 480 | Refresh Index 490 |
|---|---|---|
| GET | List of changes with GET | 0 |
| PUT | List of changes with PUT | 0 |
| MERGE | Changes made with MERGE | 1 |
| POST | Changes made with POST | 4 |
| DELETE | Changes made with DELETE | 5 |

REFLECTING DATA MODIFICATION REQUESTS IN AN OFFLINE ENVIRONMENT

RELATED APPLICATIONS

This application is related to U.S. patent application Ser. No. 14/080,951, filed on Nov. 15, 2013, and to U.S. patent application Ser. No. 14/080,968 filed on Nov. 15, 2013, which are incorporated herein by reference.

FIELD

The present disclosure relates generally to making data modifications by a client device. More particularly, the present disclosure relates to systems and methods for making data modifications in an offline environment and reflecting these modifications when connectivity is restored.

BACKGROUND

Data providers provide data that can be shared by different client devices. The client devices, which may include mobile devices, may request such data and perform operations using the data. The client devices may also send requests to the data providers to make changes to the data. These requests may be made based on the results of operations performed by the client device.

The client devices and the data providers may communicate via an online protocol. When a client device is connected to the data provider, the client device may use the online protocol to receive the most up-to-date information from the data provider. However, connectivity of the client device to the data provider may be lost due to the client device being in an area with limited connectivity. When the connectivity is lost, the client device may not receive updated data and may not be able to perform some or all of the operations. Even if some operations are performed while connectivity is not available, existing systems and methods do not provide for these operations to be reflected locally while connectivity is not available. Furthermore, existing systems and methods do not provide for these operations to be reflected back to the data provider when connectivity is restored.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

SUMMARY

According to one exemplary aspect of the present disclosure, systems and methods provide for requests to be processed on a client device receiving data from a data provider, even when connectivity to the data provider is not available. According to one embodiment, a method for processing data requests may include storing data on a client device received from a data provider maintaining the data. A request may be received to modify the data maintained by the data provider. When connectivity to the data provider is available, the request may be sent to the data provider. When connectivity is not available the request may be processed based on the data stored on the client device and the modified data may be stored on the client device.

DETAILED DESCRIPTION

The present disclosure provides systems and methods that may process requests on a client device receiving data from a data provider, even when connectivity to the data provider is not available. The methods provide for the client device to perform the operations based on data that is stored locally when connectivity to the data provider is not available. When connectivity is restored, the operations performed when connectivity was not available may be sent to the data provider and the updated data may be received from the data provider. One advantage of the proposed methods and systems is that the data provider does not need to be reprogramed in order for client device to be able to perform the operations locally when connectivity is not available.

Figure 1:
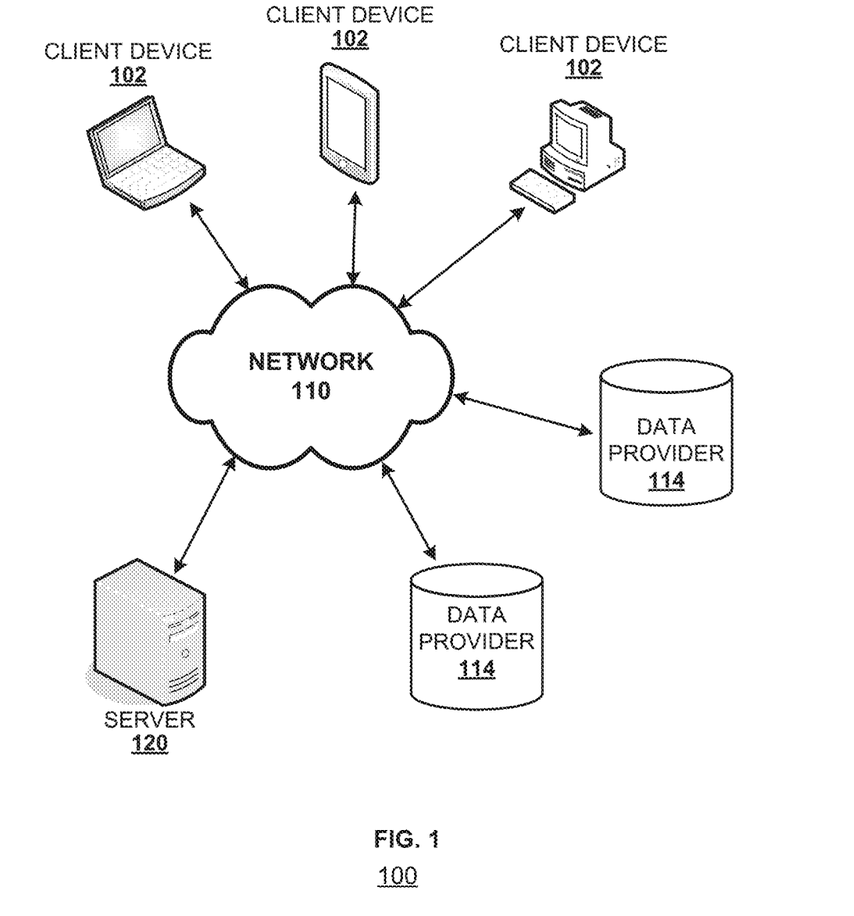
FIG. 1 is a block diagram illustrating an example embodiment of a networked environment in which a client device connects to one or more data providers via a network.

FIG. 1 is a block diagram illustrating an example embodiment of a networked environment 100 in which a client device 102 connects to one or more data providers 114 via a network 110. The client device 102 may connect to the data providers 114 via a server 120 connected to the network 110.

The client device 102 may request data from data sources maintained by the data providers 114. In one embodiment, the client device 102 may request a subset of master data maintained by one or more data providers 114. The client device 102 may request multiple subsets of data from a master data source maintained by different data providers 114. The data made available to the client device 102 by the data providers 114 may be specific to an application being executed on the client device 102 and/or specific to the data the user of the client device 102 is authorized to receive. The client device 102 may store a local copy of the data received from the data provider 114 on the client device 102 (e.g., database on or associated with the client device).

The client device 102 may not have constant connectivity to the data provider 114. When the client device 102 does not have connectivity to the data provider, the client device 102 may continue to perform operations based on the locally stored data on the client device 102. When connectivity is restored, the client device 102 may update the data provider 114 with all of the changes made to the data while connectivity was not available. In addition, the client device 102 may receive the updated data from the data provider 114 when connectivity is restored.

The data stored by the data provider 114 may be based on a model (e.g., object or hierarchical model) that is different from a model (e.g., relational model) used by the client device 102. For example, the data provider 114 may provide data based on a first physical data model and the client device may use a second physical data model, which is different from the first physical data model. In one embodiment, the first data model may be a first database model and the second data model may be a second database model, which is different from the first database model. The protocol (e.g., Open Data Protocol (OData)) used to access the data from the data providers 114 may also provide data based on a model that is different from the model used by the client device 102. In one embodiment, the protocol used to communicate between the data provider 114 and the server 120 may be different from the protocol used to communicate between the server 120 and the client device 102.

The model for storing, processing or manipulating the data on each client device 102 may be different. The model in each client device 102 may be based on the type of device, hardware on the device, and/or application operating on the device. One or more of the client devices 102 may process data using different models, based on the type of application or type of data being processed.

To allow the client device 102 to access and manipulate data received from the data provider 114, the client device 102 and/or the server 120 may perform mapping between the different models. While the physical data models used by the client device(s) 102, the data provider 114 and/or the server 120 may be different, the mapping may provide the same logical model across multiple devices. In one example, the data model on the client device(s) 102 may be a lightweight model or a model of the protocol used to communicate between the client device 102 and the server 120. The model on the data provider may be a model of the protocol used to expose data provided by the data provider 114.

The client device 102 may execute applications included on the client device 102 or may execute web-based applications provided by the server 120 via the network 110. The applications executed by the client device 102 may send and receive data to and from the server 120 and/or the data providers 114. The data may be generated, displayed and processed by the client device 102.

In one embodiment, the server 120 may provide a staging area for the data before it is transferred to the client device 102 from the data provider 114. The server 120 may perform the data model mapping and may include a database to store the data to be transferred to the client device 102. The database in the server 120 may be an in-memory database (e.g., SAP® HANA database).

The network 110 may be an internal network, an external network or a plurality of different interconnected networks which may include the Internet. In one embodiment, the server 120 may connect to the data providers 114 via an external network and may connect to the client device 102 via an internal network.

The client device 102 may include, for example, a mobile device (e.g., mobile phone or a smart phone), a personal computer, a tablet, a terminal device, or a personal digital assistant (PDA). The client device 102 may include an input device (e.g., a touch screen, a touch pad, a mouse or a keyboard) to receive commands from the user. In one embodiment, the client device 102 may be a terminal that displays information provided by the server 120. The server 120 may send applications to be executed by the client device and/or send information to be displayed on the client devices 102 in response to commands issued at the client device 102.

The data provider 114 may be a data warehouse. The data warehouse may perform data cleaning, integration, transformation and refreshing. The data in the data warehouse may be exposed via the Open Data Protocol (OData). In general, OData is a Web protocol for requesting and updating data stored at the data provider 114. OData is operated by applying and budding upon Web technologies such as Hypertext Transfer Protocol (HTTP), Atom Publishing Protocol (AtomPub), and JavaScript® Object Notation (JSON) to provide access to information from a variety of applications, services, and stores. OData may be used to expose and access information from a variety of sources including, but not limited to, relational databases, file systems, content management systems and traditional Web sites.

In one embodiment, the client device 102 may use a relational database and OData may be used to expose data provided by the data provider 114. If data is transferred from the data provider 114 to the client device 102 via the server 120, the server 120 may include a Java OData component to communicate with the data provider 114 and a program to convert the OData model into the relational database used by the client device 102. The server 120 may include SYBASE MobiLink® synchronization technology to communicate with the data provider 114 and/or the client device 102. The server 120 may use OData metadata to build the relational data model and generate mapping from the OData to the relational model. The relational model and the mapping may be stored in the server 120 and transferred to the client device 102 upon request. The client device 102 may communicate with the server 120 via the MobiLink protocol and may include an SQL based application (e.g., SYBASE UltraLite® database technology) to process the data. SYBASE UltraLite® may provide a lightweight application designed for small-footprint mobile devices using relational databases.

The client device 102 may use a first data model (e.g., first database model) that is different from a second data model (e.g., second database model) used to expose data in the data provider 114. The server 120 may generate the mapping between the first data model and the second data model. The protocol used to expose and update data from the data producer 114 may be different from the protocol used to transfer data between the client device 102 and the server 120. In one embodiment, the protocol used to expose data from the data producer 114 may be an online protocol (e.g., OData). In one embodiment, the protocol used to transfer data between the client device 102 and the server 120 may be an offline protocol (e.g., protocol provided by SYBASE SQL Anywhere MobiLink®).

Figure 2:
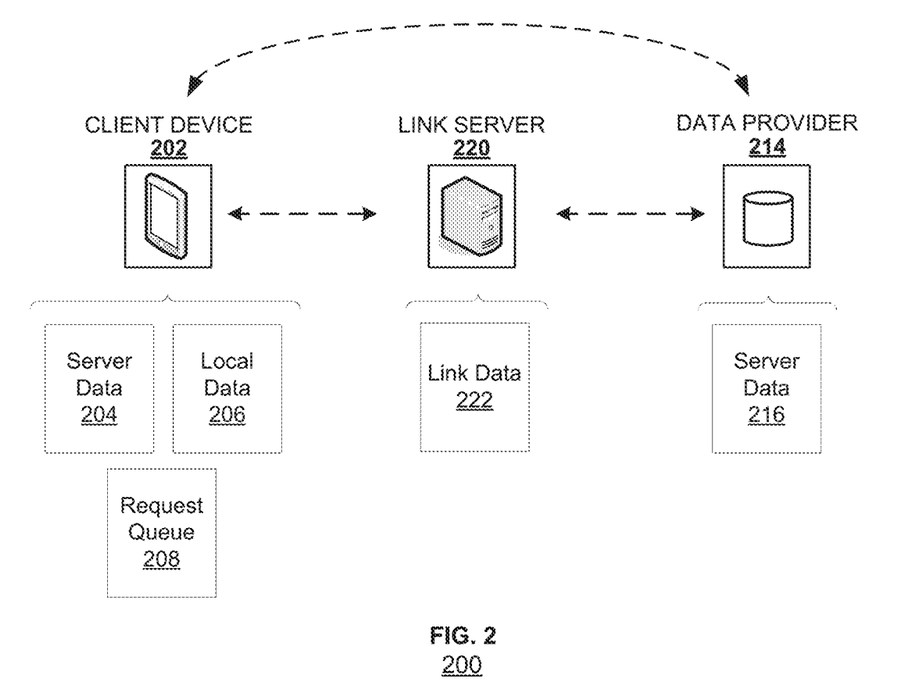
FIG. 2 illustrates a networked environment of a client device and a data provider according to an embodiment of the present disclosure.

FIG. 2 illustrates a networked environment 200 of a client device 202 and a data provider 214 according to an embodiment of the present disclosure. The client device 202 may connect to the data provider 214 directly or via a link server 220. In one embodiment, the client device 202 may send requests to the data provider 214 directly and may receive responses via the link server 220. The client device may issue requests to the data provider 214 and the link server 220. The requests may include request for data or manipulations to be made to the data.

According to one embodiment, the client device 202 may not have connectivity to the data provider 214 and/or the link server 220 for a period of time. That is, the client device may be connected to the data provider 214 or the link server 220 intermittently. As such, the client device may need to optimize communication of data using an offline communication protocol (e.g., protocol provided by SYBASE SQL Anywhere Mobilink®), which may include communication data integrity and reduce data corruption even in case of intermittent communication disconnections.

When the client device 202 is connected to the data provider 214 or the link server 220, the client device 202 may operate in an online mode during which requests are sent to the data provider 214 or the link server 220 at the time they are made. In response to these requests, the data provider or the link server 220 may send the requested data to the client device 202 or perform the requested operations.

When the client device 202 is not connected to the data provider 214 or the link server 220, the client device 202 may operate in an offline mode during which requests are processed locally on the client device 202 until connectivity is restored. During the offline mode the client device 202 may process requests based on data stored locally on the client device 202. When the connectivity is restored, the requests may be processed as they would have been during connectivity. For example, when the connectivity is restored the requests made during the offline mode may be sent to the data provider 214 or the link server 220. Thus, the client device 202 may still perform requested operations during the offline mode using the data stored locally and send the requests to the data provider 214 of the link server 220 when connectivity is restored. In one embodiment, sending the requests to the data provider 214 or the link server 220 may include sending the data processed locally on the client device 202 during the offline mode.

As shown in FIG. 2, the data provider 214 may include server data 216. The link server 220 or the client device 202 may request the server data 216 or a portion of the server data 216 from the data provider 214. The link server 220 may include link server data 222 which corresponds to the data received from the data provider 214. The client device 202 may include locally stored server data 204, local data 206, and request queue 208. The server data 204 on the client device 202 may correspond to the data received from the data provider 214 or the link server 220. The local data 206 on the client device 202 may correspond to data that is locally modified or added (e.g., while the client device 202 is in the offline mode). The local data 206 may include server data 204 that is modified or new data.

While in the online mode, the client device 202 may receive data from the data provider 214 or the link server 220 and store the data in the server data 204 on the client device 202. As changes are made to the server data 216 or to the link server data 222, the changes may be updated with the server data 204 on the client device 202. While in the offline mode, the client device 202 may use the locally stored server data 204 to process the requests. As data in the server data 204 is modified or new data is created, the changed or new data may be stored with the local data 206. The locally stored data 204 may be maintained the same until updates are received from the data provider. As the locally store data 204 is to be maintained the same, the client device 202 may use the local data 206 for any subsequent requests to make further changes to the data.

The request queue 208 may include requests made by the client device 202 during the offline mode. When connectivity is restored, the client deice 202 may process the requests made during the offline mode to update the data on the data provider 214 or the link server 220. When connectivity is restored, the client device 202 may also update the server data 204 with the most recent data.

Figure 3:
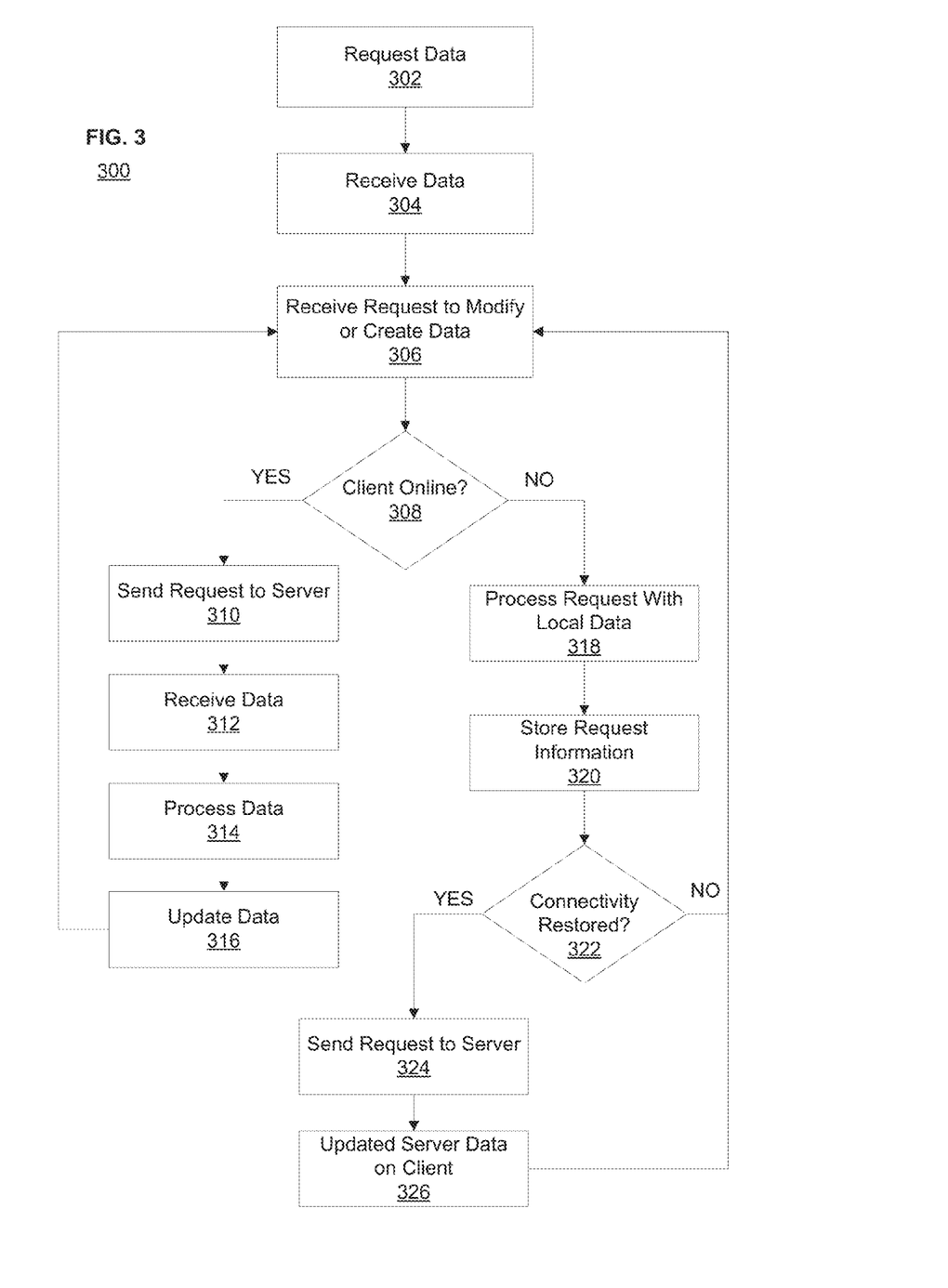
FIG. 3 illustrates a method for processing data requests in an online and offline environment according to an embodiment of the present disclosure.

FIG. 3 illustrates a method 300 for processing data requests in an online and offline environment according to an embodiment of the present disclosure. The method 300 may be performed by a client device (e.g., client device 102 or 202) in communication with a server providing data to the client. In one embodiment, the client device may communicate with the server via a link server. In one embodiment, the server may be an OData Producer.

The method 300 may include requesting data (block 302) from the server. The request may include a request for a portion of a data stored on the server. The request may include details of the client (e.g., type of client, hardware on the client, client user name and/or password). The client may initially send a request for data available to be received and in response to this information request a portion or all of the available data to be sent by the server.

In response to the request, the server may send the requested data. The client may receive the data (block 304) and store a portion or all of the data in memory associated with the client. Thus, the client may locally store a copy of the server data. In one embodiment, the client may receive the schema of the data and reconstruct a database maintained by the server. Receiving the data from the server may also include receiving changes made to the data on the server. The changes to the data on the server may be made by the server or other clients accessing the data and making modifications to the data.

Applications on the client may perform operations that include accessing the data maintained by the server. These operations may include requests to modify or create new data (block 306). The request to modify the data may include making modifications to the content or deleting the content. At the time the request to modify the data is made, a determination may be made as to whether client device is connected to the server (block 308). If the client is connected (YES in block 308), then the request may be processed by communicating with the server (blocks 310-314). If the client is not connected (NO in block 308), then the request may be processed locally (blocks 316-318). Thus, even when connectivity to the server is not available, the client may still process the request.

If the client is connected (YES in block 308), then the request may be sent to the server (block 310). In response to the request, the client may receive the latest copy of the data (block 312), perform operations using the data (block 314), and/or update the data (block 316). Receiving the latest copy of the data may include receiving the data from the server or from the data stored locally on the client. Updating the data (block 316) may include sending a request to update the data stored on the server. In one embodiment, at the time the request is sent to update the data store on the server, a request may be made to update the data stored locally on the client. Once the update is performed, the method may continue to process the next request (block 306).

If the client is not connected (NO in block 308), then the request may be processed locally with the local data (block 318). Processing the request locally may include using only the data stored locally to process the request. The locally stored data may include server data that was received when connectivity was available and/or data that was previously modified when connectivity was not available.

In this step, when the request includes modifying the data, the client may create a new entity with the modified data, while not modifying the original data received from the server. With the creation of the new entity, representing the modified data, the original server data may be set to being inactive while the new entries are set to being active. Thus, subsequent queries for the data will return the modified data instead of the originally received data from the data provider. Maintaining the original values received from the server, allows for the client to still use the original data if it becomes necessary (e.g., to perform a reapply process and/or when data is corrupted).

Similarly, a new entity may be created when a request to create a new entity is made. When a request is made to delete an entity, if the original server data is active then the original data may be set to being inactive. If the previously modified data is active, the newly created data may be deleted and the original server data may be set to be inactive.

In addition, the request information may be stored (block 318) on the client. The request information may be processed when connectivity is restored on data that is maintained by the data provider. Storing the request information (block 318) may include storing a request identifier, a list of local changes made by that request and/or a refresh index. The refresh index may keep track of the request being applied to the server. The refresh index may initially be set to zero and be changed to a current refresh index of the client when the requests are processed.

If after the request is processed the connective is not restored (NO in block 322), the method may continue to process the next request (block 306). When the connectivity is restored (YES in block 322), the stored requests may be sent to the server (block 324) to update the data stored by the server. As the data stored by the server is modified based on the stored request, the original server data stored on the client may also be updated (block 326). As the original server data stored on the client is updated, the corresponding newly created data stored on the client may be deleted and the original server data may be set to be active again.

Figure 4:
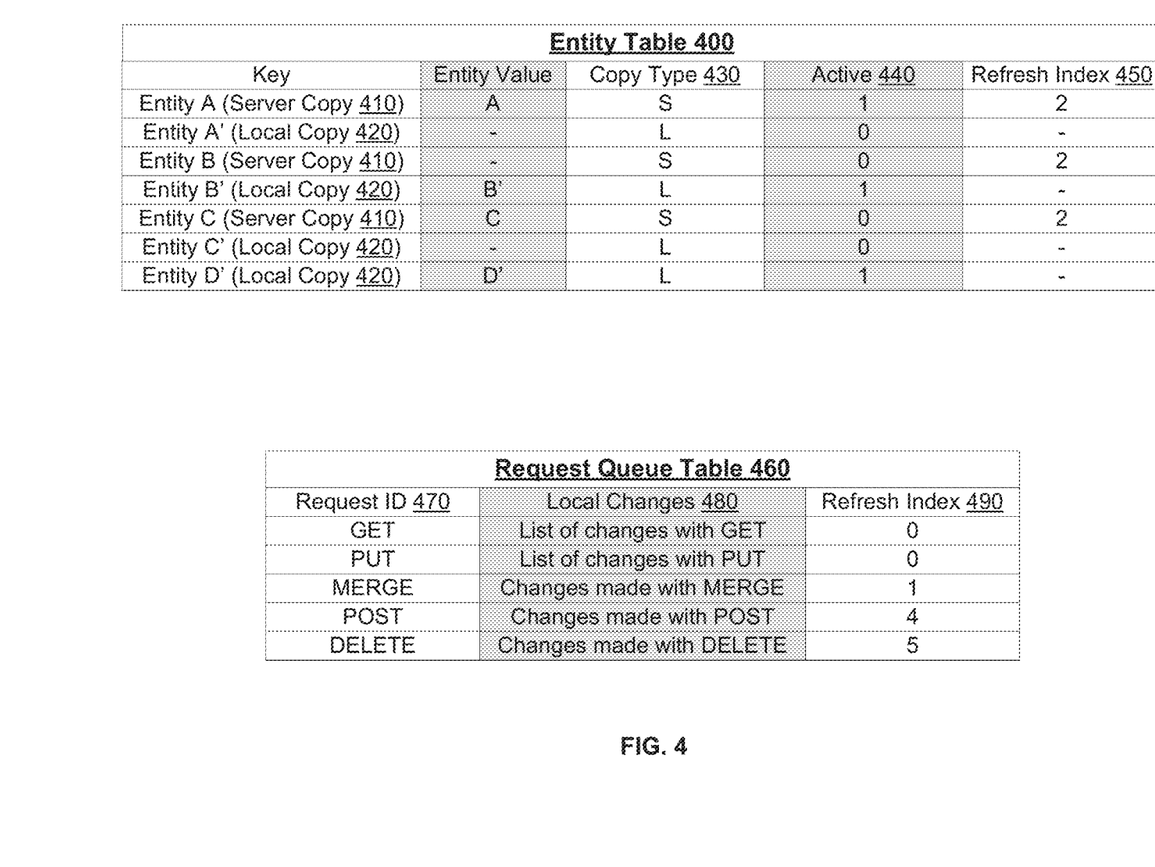
FIG. 4 illustrates data that may be stored on the client according to an embodiment of the present disclosure.

FIG. 4 illustrates data that may be stored on the client according to an embodiment of the present disclosure. The data stored on the client may include at least one entity table 400 and at least one request queue table 460. Every entity in the table 400 may include a row for server copy data 410 and a row for local copy data 420. In addition, the entity table 400 may include one or more of copy type 430, active status 440, and refresh index 450 for each entity. The request queue table 460 may include a request identifier 470, list of local changes made by the request 480, and a refresh index 490 for each request.

In one embodiment, a single request queue table 460 may be provided on the client. In another embodiment, a plurality of request queue tables 460 may be provided on the client and each request queue table may be associated with one or more entity tables 400. While FIG. 4 illustrates a specific example of content and arrangement of the content, other arrangements and values may be used to represent the content illustrated in the tables of FIG. 4.

The server copy data 410 in the entity table 400 may include data that is received from a server (e.g., data provider). The server copy data 410 may be received from the server when connectivity is available and stored in memory associated with the client. As shown in FIG. 4, the server copy data 410 may include entities A-C. The entities in the server copy data 410 may be updated as changes are made to the data maintained by the server.

The local copy data 420 may include data that is changed or created while the client does not have connectivity to the server or is not able to process a request. For example, when connectivity is not available and the client wants to modify an entity (e.g., change the value), the client may provide the changed entity in the local copy data 420, without modifying the server copy 410. As shown in FIG. 4, if entity B in the server copy data 410 needs to be changed, the client may request the server copy data 410 of entity B, modify the content of entity B, and store the changed entity B' in the local copy data 420. If the entity B in the server copy data 410 needs to be further modified (i.e., after a local copy of the changed entity B' already exists), the entity B' copy may be requested, modified and stored in the local copy data 420. If the client wants to insert a new entity, the new entity may be inserted in the local copy data 420. As shown in FIG. 4, a new entity D', which is not provided in the server copy 410 may be inserted as part of the local copy data 420.

The copy type 430 in the entity table may indicate whether the row reflects the server copy 140 or the local copy 420. In one example, the copy type may include an 'S' to indicate the server copy 410, or an 'L' to indicate a local copy 420. As shown in FIG. 4, the copy type 430 for entities A, B, and C and D may be set to 'S' to indicate a server copy. These values represent the values obtained from the server and which have not been changed locally. The copy type 430 for entities A', B', and C' and D' may be set to 'L' to indicate a locally modified copy. If a value is present in these rows, then the values was modified or added when the client was offline. These local copies may be used for further operations when the client is offline. When data is initially received from the server or when all of the data is synchronized with the server, all of the copy type 430 in each row may be set to 'S'.

The active column 440 may indicate whether the data in the row is currently visible or not. An active row may be a row that is returned in response to queries and an inactive row may be a row that is hidden from the queries but remains in the table. When a client software development kit library converts requests (e.g., OData request) to local queries (e.g., SQL queries), the request may return only rows that are marked as active. Initially, when all of the server copy rows 410 are synchronized with the server, all of the server copy rows 410 may be set as active and all of the local copy rows 420 may be set as inactive. As modifications are made to the entities, values may be provided in the local copy rows 420 and those rows may be set as active, while the corresponding server copy may be set as inactive. For every entity entry at most one of the server and local copy may be active at a time. The server and local copy may both be inactive when a row is deleted by the application. In one embodiment, when a row is deleted, the local row copy may be deleted and the server copy set to be inactive.

As shown in FIG. 4, the entity A from the server copy may be set to visible, as indicated by '1', because entity A has not been modified. The entities B' and D' may be set to active, as indicated by '1', because these entities were modified or added. Rows that are inactive may be set to '0'. As shown in FIG. 4, both the local copy and server copy of entity C may be set to be inactive because a request is processed to delete entity C. In one embodiment, even if the row (e.g., server row) is set to be inactive, a special request may be made to return an entity from the inactive row.

The refresh index 450 may contain an index (e.g., a count or a time) of the refresh. The refresh index 450 may keep track of changes made to data in the table 400. In one embodiment, the refresh index 450 may initially be set to a current refresh index of the client (e.g., N) and may be adjusted each time the values in the table are synchronized with the server. The refresh index 450 may be adjusted to match a current refresh index of the client each time the values in the table are synchronized with the server (e.g., in response to processing a request in the request queue table 460). In one embodiment, the refresh index may be applied only to the server copy rows 410 and may be null for local copy rows 420.

Each row may include a primary key (providing a unique value) identifying the rows of the table 400. The primary key may identify the characteristics of the row and may include characteristics that cannot collectively be duplicated by any other row. In one embodiment, the copy type 430 may be part of the primary key, and the active column 440 may not be part of the primary key.

The request queue table 460 may provide for storage of requests processed while the client does not have connectivity to the client. When connectivity is restored, the requests stored in the request queue table 460 may be processed to modify the data stored on the server. As requests are accepted by the server, the requests may be deleted from the request queue table 460.

The request identifier 470 may include each request processed while the client does not have connectivity to the server. A row may be provided for each request. These requests may include requests that would have been sent to the server if connectivity was available but instead were processed with the data stored locally on the client (e.g., ether local server data or local modified data. The request identifier 470 may also include requests that may have been made earlier but have not had time to be sent to the server for processing.

The local changes made by the request 480 may include a list of changes made with the respective request. A single request may result in one or more conceptual changes to the data (e.g., creating an entity). In one embodiment, each of these conceptual changes may require one or more actual changes to the local data (e.g., adding an entry to the entity table). The list of changes may include a list of all the actual changes on a per-request basis. In one embodiment, the list may include SQL statements and their parameters on a per-request basis. The changes in the list may be incremental in that a change is written with the assumption that when applied, all of the previous changes have already also been applied.

As discussed above, the client may maintain a current refresh index (e.g., a numerical count or a time) to keep track of when changes to the data are made and when requests are sent to the server. If a count is used to keep track of the refresh index, the current refresh index of the client may be represented by N, and may be incremented (e.g., N+1) each time a download from the server is started. As discussed above, when an entity is updated with the value provided by the server, the refresh index 450 of the entity is set to the current refresh index. At this time, the local copy 420 of the updated entities will be deleted and made inactive.

Similarly, when a request in the request queue table 460 is sent to and processed by the server, the refresh index 490 of the processed request may be set to an incremented value of current refresh index (e.g., N+1). Initially the refresh index of the requests 490 may be set to zero.

After synchronization of one or more entities with the server data, the entities in table 400 may need to be refreshed with outstanding requests in the request queue table 460. These outstanding requests may include requests that have not been sent to the server to be processed (e.g., due to limited time of connectivity to the server). Thus, a reapply of the requests may need to be made using the updated server copy data 410. During the reapply process all of the local copy data 420 may be deleted and the requests in the request queue table 460 may be processed using the server copy data 410. However, because some of the requests have already been sent to the server and the changes due to these requests are already reflected in the server copy data 410, some requests do not need to be processed again. Requests that do not need to be processed again may include requests with a refresh index 490 that is less than or equal to the refresh index 450 of the row the request intends to change.

The reapplication of the requests may replace fake keys with real keys because the local changes may still reference fake keys even though the respective real keys are available in the server rows. Thus, as the requests are reapplied locally, any fake keys may be replaced with updated keys received from the server.

The reapplication of the requests may also resolve conflicts. The conflict may exist when the server row is different from an expected value due to a failed request or due to being changed by other users. Such a case would make the local changes inconsistent. For example, if there is a local update to a row that was reverted by the last download, then the local row may no longer be valid. Reapplying the changes may cause the update to become a no-operation and may restore the local changes to a consistent state.

In addition, reapplication of the requests may provide more accurate representation of the data stored on the client. This may be true even for data that is not directly being modified by the client locally. For example, if a series of client updates only update one column (e.g., column C1) and the latest download updates another column (e.g., column C2), then reapplying the local changes to the new updated row may allow the changes to both columns be visible in the locally stored row.

Supporting entity tags (ETags) in an offline mode may include defining ETag place-holders. After each successful request, a search may be performed through the subsequent request in order to replace the ETag place-holders.

As discussed above, during the offline mode an entity may be inserted into the local data. Such a request during an online mode would cause the server to assign primary key properties. In order to mimic this behavior locally, key properties (e.g., a fake key) may be generated locally during the offline mode on behalf of the server. Thus, the local row may include a client-generated entity-id providing a primary key that is a fake key. The fake key may be generated in a way to easily identify it as having been created on the client rather than by the server.

If the application on the client updates an entity having a fake key before the entity is added at the server, the update operations may occur on the fake-key. In this case, the refresh index 490 of the request may be set to NULL to indicate that the request cannot be sent until the result of the request on which it depends is received from the server. This may provide correct results because the real entity-id should be used for the server (OData) requests to update the entity. Thus, when the insert request is performed on the server, the client library may go through all the requests with a NULL refresh index 490 and attempt to replace the generated key with the real entity-id.

In another embodiment, the requests may be processed one at a time, with the next request being held until the previous request finishes being processed. In this embodiment, the refresh index 490 of the request may not need to be set to NULL to indicate that the request cannot be sent until another request is finished. In this embodiment, when a particular request is next to be sent, a search may be performed for generated keys from the previously processed requests. These keys may be replaced because all previous requests are finished and already reflect the real entity-ids.

In one embodiment, the operations of the client and link server may be performed by a single device (e.g., mobile device or a personal computer).

The data models for storing and exposing data on the client and/or the server may include one or a combination of models. The data models may include logical data models or physical data models. The logical data models may include hierarchical database model, network model, relational model, entity-relationship model, enhanced entity-relationship model, object model, document model, entity-attribute-value model, and star schema. The physical data model may include inverted index or flat file. Other models may include associative model, multidimensional model, multivalue model, semantic model, DML database, named graph or triplestore.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

Figure 5:
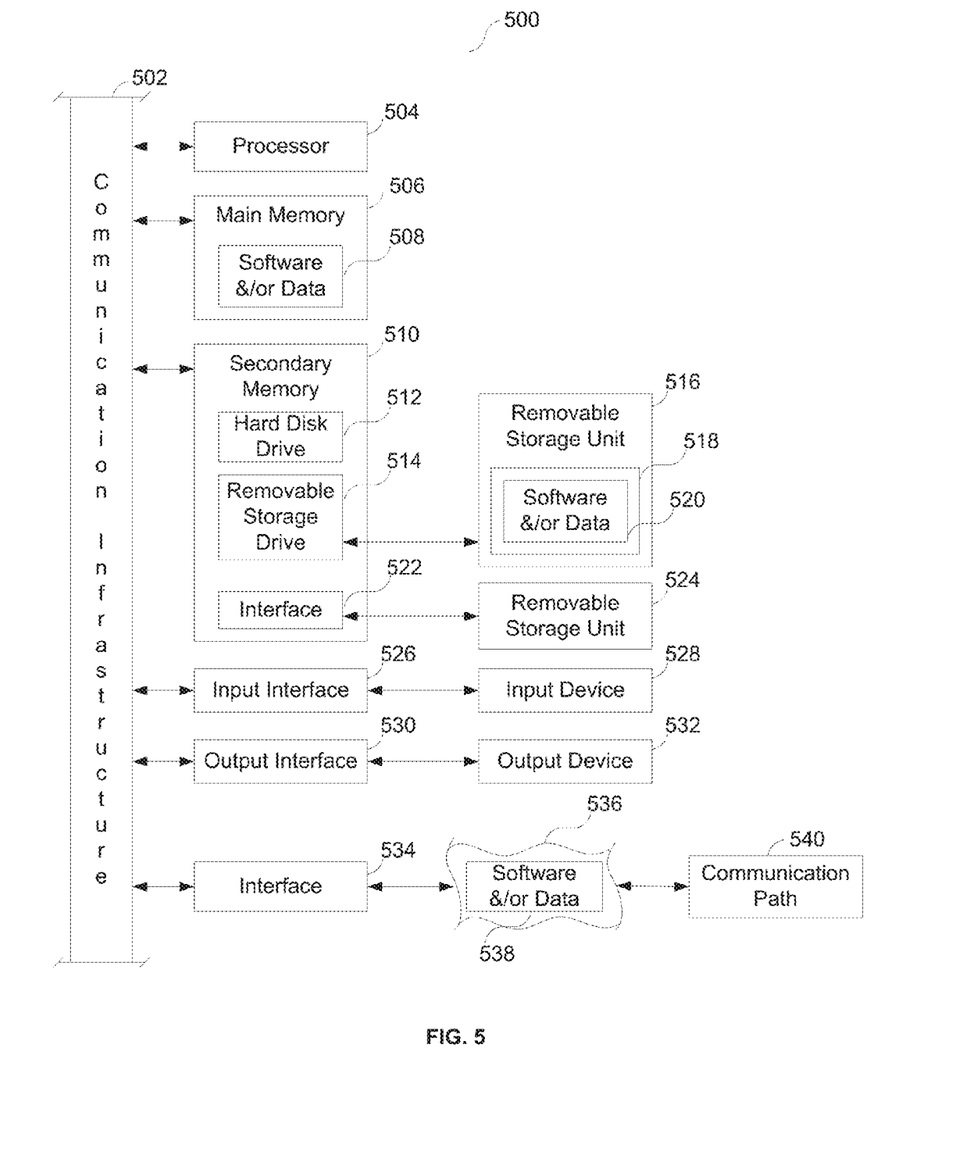
FIG. 5 illustrates an example computer system in which one or more embodiments of the present disclosure may be implemented as computer-readable code.

Aspects of the above may be implemented by software, firmware, hardware, or any combination thereof. FIG. 5 illustrates an example computer system 500 in which the above, or portions thereof, may be implemented as computer-readable code. Various embodiments of the above are described in terms of this example computer system 500.

Computer system 500 includes one or more processors, such as processor 504. Processor 504 can be a special purpose processor or a general purpose processor. Processor 504 is connected to a communication infrastructure 502 (for example, a bus or a network).

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, magnetic tape, optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 516, removable storage unit 524, and a hard disk installed in hard disk drive 512. Signals carried over communications path 540 can also embody the logic described herein. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Computer programs may also be received via communications interface 534. Such computer programs, when executed, enable computer system 500 to implement the present disclosure as discussed herein. In particular, the computer programs, when executed, enable processor 504 to implement the processes of aspects of the above. Accordingly, such computer programs represent controllers of the computer system 500. Where the disclosure is implemented using software, the software may be stored in a computer program product and loaded into computer system 500 using removable storage drive 514, interface 522, hard drive 512 or communications interface 534.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future.

Examples of computer readable storage media include, but are not limited to: primary and/or secondary devices, magnetic media, such as hard disks, floppy disks, Zip disks, tapes, and magnetic tape; optical media such as Compact Disc Read-Only Memory (CD-ROM) disks, DVDs and holographic devices; magneto-optical media; and hardware devices that are specially configured to store and execute, such as application-specific integrated circuits ("ASICs"), programmable logic devices ("PLDs") and ROM and RAM devices, Microelectromechanical Systems (MEMS), nanotechnological storage device, etc.), and communication mediums (e.g., wired and wireless communications networks, local area networks, wide area networks, intranets, etc.). Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hard-wired circuitry in place of, or in combination with machine readable software instructions.

It is important to note that the particulars of FIG. 5 (such as for example the specific components that are presented, the component arrangement that is depicted, etc.) are illustrative only and it will be readily apparent to one of ordinary skill in the relevant art that numerous alternatives (including inter alia other or different components, alternative arrangements, etc.) are easily possible.

A data provider may be an information resource. A data provider may include sources of data that enable data storage and retrieval. A data provider may include databases, such as, relational, transactional, hierarchical, multi-dimensional (e.g., Online Analytic Processing—OLAP), object oriented databases, and the like. Further, a data provider may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., Enterprise resource planning system), and the like. These data providers can include associated data foundations, semantic layers, management systems, security systems and so on. The data from the data provider may be exposed via the Open Data Protocol (OData).

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that they can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

In the above description, numerous specific details are set forth to provide a thorough understanding of embodiments of the disclosure. One skilled in the relevant art will recognize, however, that the various embodiments can be practiced without one or more of the specific details or with other methods, components, techniques, etc. In other instances, well-known operations or structures are not shown or described in detail to avoid obscuring aspects of the disclosure.

For simplicity of exposition, the term 'database' was employed in aspects of the above discussion. It will be readily apparent to one of ordinary skill in the art that in the context of the above discussion the scope of that term is not limited just to, for example, a database management system but rather encompasses inter alia any data source, data model, etc.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize. These modifications can be made to the embodiments in light of the above detailed description.

What is claimed is:

1. A method for processing data requests, the method being implemented by one or more hardware data processors forming part of at least one computing device, the method comprising:
storing, by at least one hardware at least one processor, data on a client device received from a data provider maintaining the data;
processing, by at least one hardware at least one processor, at least one request to modify the data maintained by the data provider, wherein processing the at least one request further comprises:
determining whether the client device has connectivity to the data provider;
in the event the client device has connectivity to the data provider, sending the request(s) to the data provider; and
in the event the client device does not have connectivity to the data provider, processing the request(s) based on the data stored on the client device, storing the request(s) in a request queue, storing the modified data on the client device, and upon establishing connectivity, updating the data provider with the changes made to the data while the client device did not have connectivity by sending the request(s) stored in the request queue to the data provider;
wherein:
a current refresh index is maintained that is incremented each time data is synchronized on the client device with the data maintained by the data provider;
a value of the current refresh index is set to a refresh index of the entities stored on the client device when the entities are synchronized with the data provider;

a value of an incremented current refresh index is set to a refresh index of the request(s) in the request queue when such request(s) are accepted by the data provider; and the request(s) is deleted upon processing by the data provider.

2. The method of claim 1, wherein the requests are Open Data Protocol (OData) requests.

3. The method of claim 1, wherein the modified data is stored on the client device without modifying the stored data received from the data provider.

4. The method of claim 3, wherein when the modified data is stored on the client device the modified data is made active such that subsequent requests for the same data will expose the modified data.

5. The method of claim 4, wherein the stored data received from the data provider that corresponds to the modified data is made inactive when the modified data is stored on the client device.

6. The method of claim 1, further comprising receiving updated data from the data provider and replacing the stored data on the client device with the updated data.

7. The method of claim 6, further comprising, when updated data is stored on the client device, deleting the modified data stored on the client device that corresponds to the updated data received from the data provider.

8. The method of claim 7, further comprising processing the requests in the request queue that have not been sent to the data provider, wherein the requests are processed using the data stored on the client device.

9. The method of claim 6, wherein the requests are sent to the data provider directly and the updated data from the data provider is received via a link server.

10. The method of claim 1, further comprising:
receiving a request to add a new entity;
in the event the client device does not have connectivity to the data provider, providing a new entity in the stored data on the client device and storing the request in a request queue; and
upon establishing connectivity, sending the request in the request queue to the data provider.

11. A client device, comprising:
a database storing data received from a data provider; and
a hardware processor in communication with the database, the processor operable to:
receive at least one request to modify the data maintained by the data provider;
determine whether client device has connectivity to the data provider;
in the event the client device has connectivity to the data provider, send the request(s) to the data provider; and
in the event the client device does not have connectivity to the data provider, processing the request(s) based on the data stored on the client device, storing the request(s) in a request queue, storing the modified data on the client device, and upon establishing connectivity, updating the data provider with the changes made to the data while the client device did not have connectivity by sending the request(s) stored in the request queue to the data provider;
wherein:
a current refresh index is maintained that is incremented each time data is synchronized on the client device with the data maintained by the data provider;
a value of the current refresh index is set to a refresh index of the entities stored on the client device when the entities are synchronized with the data provider;
a value of an incremented current refresh index is set to a refresh index of the request(s) in the request queue when such request(s) are accepted by the data provider; and
the request(s) is deleted upon processing by the data provider.

12. The client device of claim 11, wherein the requests are Open Data Protocol (OData) requests.

13. The client device of claim 11, wherein the modified data is stored in the database without modifying the data received from the data provider.

14. The client device of claim 13, wherein when the modified data is stored in the database, the modified data is set to be active such that subsequent requests for the same data will expose the modified data.

15. The client device of claim 14, wherein the stored data received from the data provider that corresponds to the modified data is made inactive when the modified data is stored in the database.

16. The client device of claim 11, wherein the processor is further configured to receive updated data from the data provider, replace the stored data in the database with the updated data, and delete all modified data stored on the client device that corresponds to the updated data received from the data provider.

17. A method for processing data requests, the method being implemented by one or more hardware data processors forming part of at least one computing device, the method comprising:
storing, by at least one hardware data processor, data on a client device received from a data provider maintaining the data;
receiving, by at least one hardware data processor, at least one Open Data Protocol (OData) request to modify the data maintained by the data provider;
determining, by at least one hardware data processor, whether the client device has connectivity to the data provider;
in the event the client device does not have connectivity to the data provider:
processing, by at least one hardware data processor, the request(s) based on the data stored on the client device;
storing, by at least one hardware data processor, the modified data on the client device without modifying the stored data received from the data provider;
setting, by at least one hardware data processor, the modified data to be active and the corresponding stored data received from the client device to be inactive, such that subsequent requests for the same data will expose the modified data; and
storing, by at least one hardware data processor, the requests in a request queue;
upon establishing connectivity to the data provider:
sending, by at least one hardware data processor, the received request(s) to modify the data to the data provider;
sending, by at least one hardware data processor, the requests stored in the request queue to the data provider;
receiving, by at least one hardware data processor, updated data from the data provider;

replacing, by at least one hardware data processor, the stored data on the client device with the updated data; and when the stored data on the client device is replaced with the updated data from the data provider, deleting corresponding modified data that was stored while connectivity was not available;

wherein:

a current refresh index is maintained that is incremented each time data is synchronized on the client device with the data maintained by the data provider;

a value of the current refresh index is set to a refresh index of the entities stored on the client device when the entities are synchronized with the data provider;

a value of an incremented current refresh index is set to a refresh index of the request(s) in the request queue when such request(s) are accepted by the data provider; and the request(s) is deleted upon processing by the data provider.

* * * * *